United States Patent [19]
Kumada et al.

[11] Patent Number: 6,018,997
[45] Date of Patent: Feb. 1, 2000

[54] TUNING FORK TYPE OSCILLATOR AND VIBRATION GYROSCOPE USING SAME

[75] Inventors: Akira Kumada, Otsu; Yoshio Kawai, Ibaraki; Jiro Inoue, Omihachiman, all of Japan

[73] Assignee: Murata Manufacturing Co., Ltd., Japan

[21] Appl. No.: 08/823,356

[22] Filed: Mar. 24, 1997

[51] Int. Cl.[7] .................................................. G01P 3/00
[52] U.S. Cl. ...................... 73/504.16; 310/370; 73/504.02
[58] Field of Search ........................... 73/504.16, 504.12, 73/504.14; 310/321, 370, 366

[56] References Cited

U.S. PATENT DOCUMENTS

| | | |
|---|---|---|
| 5,159,301 | 10/1992 | Kaida ........................................ 310/370 |
| 5,329,816 | 7/1994 | Soderkvist ............................. 73/504.16 |
| 5,373,269 | 12/1994 | Kaida et al. . |
| 5,394,123 | 2/1995 | Inoue et al. . |
| 5,434,547 | 7/1995 | Kaida ........................................ 310/370 |
| 5,451,828 | 9/1995 | Tomikawa ............................. 73/504.16 |
| 5,691,595 | 11/1997 | Tomikawa ................................ 310/370 |

*Primary Examiner*—Christine K. Oda
*Attorney, Agent, or Firm*—Ostrolenk, Faber, Gerb & Soffen, LLP

[57] ABSTRACT

A vibration gyro which is equipped with an oscillator in which slits are made in a flat-plate piezoelectric board to form a tuning fork section. For construction of the oscillator, driving electrodes for vibrating the tuning fork section are formed in the vicinity of end portions of the slit, while detection electrodes for detecting an rotational angular velocity in a longitudinal direction of the tuning fork section are formed on the arm portions of the tuning fork section.

20 Claims, 9 Drawing Sheets

TUNING FORK TYPE OSCILLATOR AND VIBRATION GYROSCOPE USING SAME

BACKGROUND OF THE INVENTION

1. Field of the Invention

The present invention relates to a vibration gyro and oscillator available for the detection of a rotational angular velocity, and more particularly to a vibration gyro and oscillator used for position control and vehicle control.

2. Description of the Related Art

Prior vibration gyros are roughly classified into tuning fork types and vibrating reed types in accordance with configurations of oscillators. Of these vibration gyros, the tuning fork type features a high stability of its oscillator and has given satisfactory results in the field of position control and vehicle control which require a high reliability.

Figure 13:
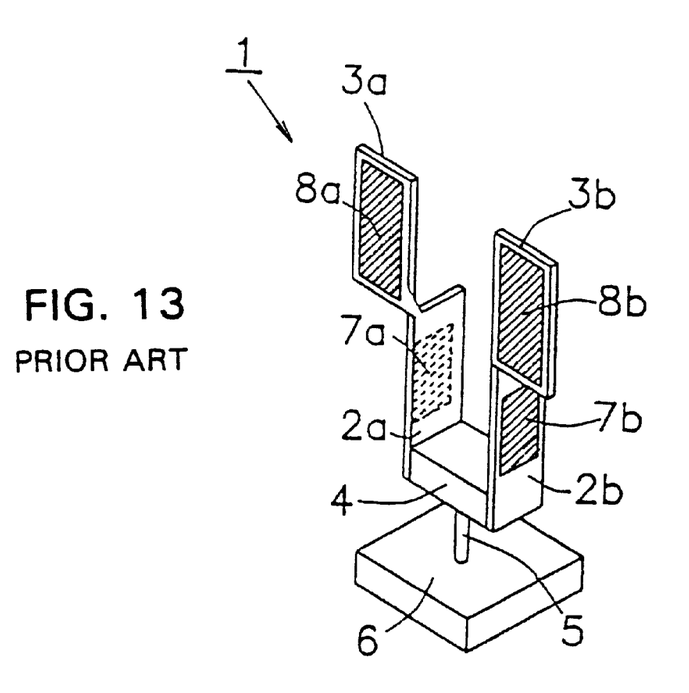
FIG. 13 is a perspective view showing one example of an oscillator of a prior vibration gyro.

As such a tuning fork type vibration gyro, the so-called Watson type have been disclosed in Japanese Unexamined Patent publication Nos. 58-174854, 60-111110, 60-216210, 62-229024 and others. FIG. 13 shows an example of the Watson type vibration gyro. In the Watson type vibration gyro, as shown in FIG. 13 an oscillator 1 comprises two driving tuning fork arm sections 2a, 2b, two detection tuning fork arm sections 3a, 3b respectively connected to one end portions of the driving tuning fork arm sections 2a, 2b, a connecting section 4 for connection between the other end portions of the driving tuning fork arm sections 2a, 2b, a supporting pin 5 for supporting the connecting section 4, and a base 6 for fixing the supporting pin 5. In this case, the driving tuning fork arm sections 2a, 2b and the detection tuning fork arm sections 3a, 3b are respectively constructed with a metallic member having a generally rectangular shape and disposed to be perpendicular to each other. Further, piezoelectric devices 7a, 7b are adhered through means such as an adhesive and solder to side surfaces of the driving tuning fork arm sections 2a, 2b, respectively. Still further, piezoelectric devices 8a, 8b are also adhered to side surfaces of the detection tuning fork arm sections 3a, 3b, respectively.

Figure 14:
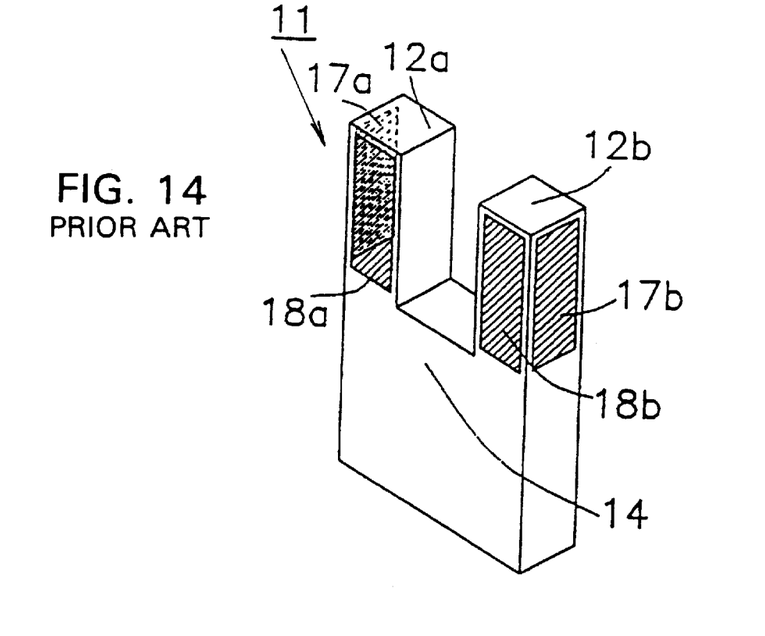
FIG. 14 is a perspective view showing another example of an oscillator of a prior vibration gyro.

In addition to such a Watson type vibration gyro, there have been known a vibration gyro in which a tuning fork section is constructed integrally with a metal or piezoelectric material, exemplified by Japanese Unexamined Patent Publication Nos. 61-294361, 3-120415 and 5-267038. For convenience only, such a vibration gyro will here be referred to as an integral tuning fork type vibration gyro. FIG. 14 is an illustration of an example of such integral tuning fork type vibration gyros. In the integral tuning fork type vibration gyro, as shown in FIG. 14 an oscillator 11 is constructed using bar-like metallic members having a square cross section, and comprises two tuning fork arm sections 12a, 12b disposed in parallel to each other, a connecting section 14 integrally molded to make connection between one end portions of the tuning fork arm sections 12a, 12b, and a base (not shown) for fixing the connecting section 14. Further, driving piezoelectric devices 17a, 17b are adhered through means such as an adhesive and solder to outside surfaces of the tuning fork arm sections 12a, 12b, respectively. Still further, detection piezoelectric devices 18a, 18b are adhered to side surfaces of the tuning fork arm sections 12a, 12b perpendicular to the outside surfaces thereof, respectively.

In the case of such an integral tuning fork type vibration gyro, it is also possible that one tuning fork arm section serves for the driving only while the other tuning fork arm section acts for the detection only. In addition, as one modification of such an integral tuning fork type vibration gyro, there has also been known a vibration gyro in which the oscillator is made to have a generally H-like configuration.

However, the above-described prior tuning fork type vibration gyros create the following problems.

First, the Watson type vibration gyro has an extremely complicated structure, and in case that the driving tuning fork arm sections and the detection tuning fork arm sections have poor orthogonal accuracy and balance, the rotational angular velocity detection accuracy deteriorates. For this reason, it requires a high assembling accuracy, which does not lend itself to mass production. Particularly, in the case of mounting it in a movable body such as a motor vehicle and an industrial robot, because of the necessity of a shock resistance of several thousands G to several ten-thousands G, it is necessary to provide a cantilever between both arm sections so that the oscillator is supported through the cantilever, which results in a more complicated construction and in a lower mass production. In addition, since in the Watson type vibration gyro the oscillator has a three-dimensional structure and has a long tuning fork arm section, the sealing case becomes large in dimension, which leads to a vibration gyro having a large size as a whole.

On the other hand, the integral tuning fork type vibration gyro has a more simplified structure of the tuning fork sections as compared with the Watson type vibration gyro, while the leakage of vibration from the tuning fork sections to the external largely occurs. Accordingly, the supporting structure for the tuning fork sections needs a device to prevent such leakage, and therefore the configuration of the supporting section naturally results in enlargement and complication, which leads to the increase of the whole vibration gyro in dimension. In addition, in the case of the integral tuning fork type vibration gyro, it is necessary that the piezoelectric devices be adhered to the side surfaces of the respective tuning fork arm sections perpendicular to each other, which substantially restricts the manufacturing process. In addition, it is necessary that electrodes be formed to the side surfaces of the respective tuning fork arm sections perpendicular to each other, if tuning fork sections are made of piezoelectric material. Thus, the integral tuning fork type vibration gyro also deteriorates in mass production as well as the Watson type vibration gyro.

Moreover, in the case of the Watson type vibration gyro and the integral tuning fork type vibration gyro, when the piezoelectric devices chiefly made of a ceramic are attached through a resin adhesive to the tuning fork arm sections made of a metal, a difference in coefficient of thermal expansion among the piezoelectric devices, the tuning fork arm sections and the adhesive occurs, with the result that, if the atmosphere temperature varies, the vibrating position of the oscillator varies due to the difference in coefficient of thermal expansion among them so that a temperature drift appears in the detection signal of the vibration gyro.

SUMMARY OF THE INVENTION

Accordingly, it is an object of the present invention to solve the above-mentioned problems and to provide a high-performance vibration gyro and oscillator which are capable of size reduction and which are suitable for mass production.

For this purpose, an oscillator for a vibration gyro may comprise a piezoelectric board having first and second opposing flat surfaces defining a tuning fork section comprising a pair of vibratable arm portions. A first driving electrode is formed on the first flat surface for vibrating the arm portions. Respective detection electrodes are formed on the first flat surface of the arm portions for detecting an angular velocity in a longitudinal direction of the arm portions.

A vibration gyro according to the present invention may comprise an oscillator including a tuning fork section in which at least a slit is made in a flat-plate piezoelectric board and tuning fork arm portions are formed in both sides of the slit, a driving electrode formed in the vicinity of an end portion of the slit for making the tuning fork section vibrate, and detection electrodes formed on the arm portions of the tuning fork sections, respectively, for generating detection signals representing a rotational angular velocity in the longitudinal direction of the arm portion of the tuning fork section. An oscillation circuit is provided for applying a driving signal to the driving electrode and a detection circuit is provided for detecting the detection signals.

In addition, the oscillator is sandwiched between upper and lower flat-plate covers to be held therebetween through a spacer having a generally frame-like configuration to surround the tuning fork section.

Furthermore, a signal proportional to the rotational angular velocity is obtained by taking the difference between the detection signals from the detection electrodes.

Still further, a joint portion of the arm portion of the tuning fork section is made to have a smaller width.

In the above-mentioned vibration gyro, when a drive signal is applied to the driving electrode, vibration is induced and spread from the driving electrode to the arm portions of the tuning fork section and the joint portions thereof. This spreading vibration causes a force which excitation-driving the arm portions of the tuning fork section in the opposite directions, so that the tuning fork section starts to vibrate. If in this state the rotational angular velocity occurs in the longitudinal direction of the arm portions of the tuning fork section, the Coriolis forces turning in the opposite directions and in directions perpendicular to the vibrating direction work on the arm portions of the tuning fork section, which brings about displacement. In addition, since charge proportional to this displacement is induced in the detection electrode provided on each of the arm portions of the tuning fork section, the detection electrodes offer the output signals having the polarities reverse to each other and proportional to the rotational angular velocity.

Moreover, taking the difference between the output signals of the detection electrodes can further remove the in-phase disturbance signals produced in the detection electrodes as compared with the case of not taking the difference therebetween, thereby obtaining a signal whose magnitude is twice that of the detection signal and which is proportional to the rotational angular velocity.

Besides, the reduction of the width of the joint portion of the arm portion of the tuning fork section causes the variation of the resonance frequency in the driving direction and detecting direction of the tuning fork section, with the result that the resonance frequency in the driving direction and the detecting direction is adjustable.

In accordance with the present invention, the oscillator can be manufactured by taking a simple way in which a slit is made in the piezoelectric board, which does not require the complicated processing taken for the oscillator of the prior tuning fork type vibration gyro. In addition, since the driving electrodes and the detection electrodes are attached onto the main surface of the piezoelectric board, the formation of the electrodes becomes easy and the difference made at the processing of the electrodes is reducible. Thus, a vibration gyro superior in mass production is attainable at a low cost.

Furthermore, since the spread of the vibration induced by the driving electrodes stops in the vicinity of the arm portions of the tuning fork section and the joint portion thereof, it is possible to employ a structure in which the oscillator is held by the upper and lower flat-plate covers through a spacer which is made to have a generally frame-like configuration to surround the tuning fork section, and therefore no leakage of the vibration from the oscillator occurs and the oscillator can firmly and stably be held and hermetically sealed. Accordingly, it is possible to realize a vibration gyro which is excellent in stability and shock resistance.

Still further, since the joint portion of the arm portion of the tuning fork section is made to have a small width, the resonance frequency of the tuning fork section in the driving direction and in the detecting direction is adjustable, so that a higher-performance vibration gyro is realizable.

BRIEF DESCRIPTION OF THE DRAWINGS

The object and features of the present invention will become more readily apparent from the following detailed description of the preferred embodiments taken in conjunction with the accompanying drawings in which.

DESCRIPTION OF THE PREFERRED EMBODIMENTS

Figure 1:
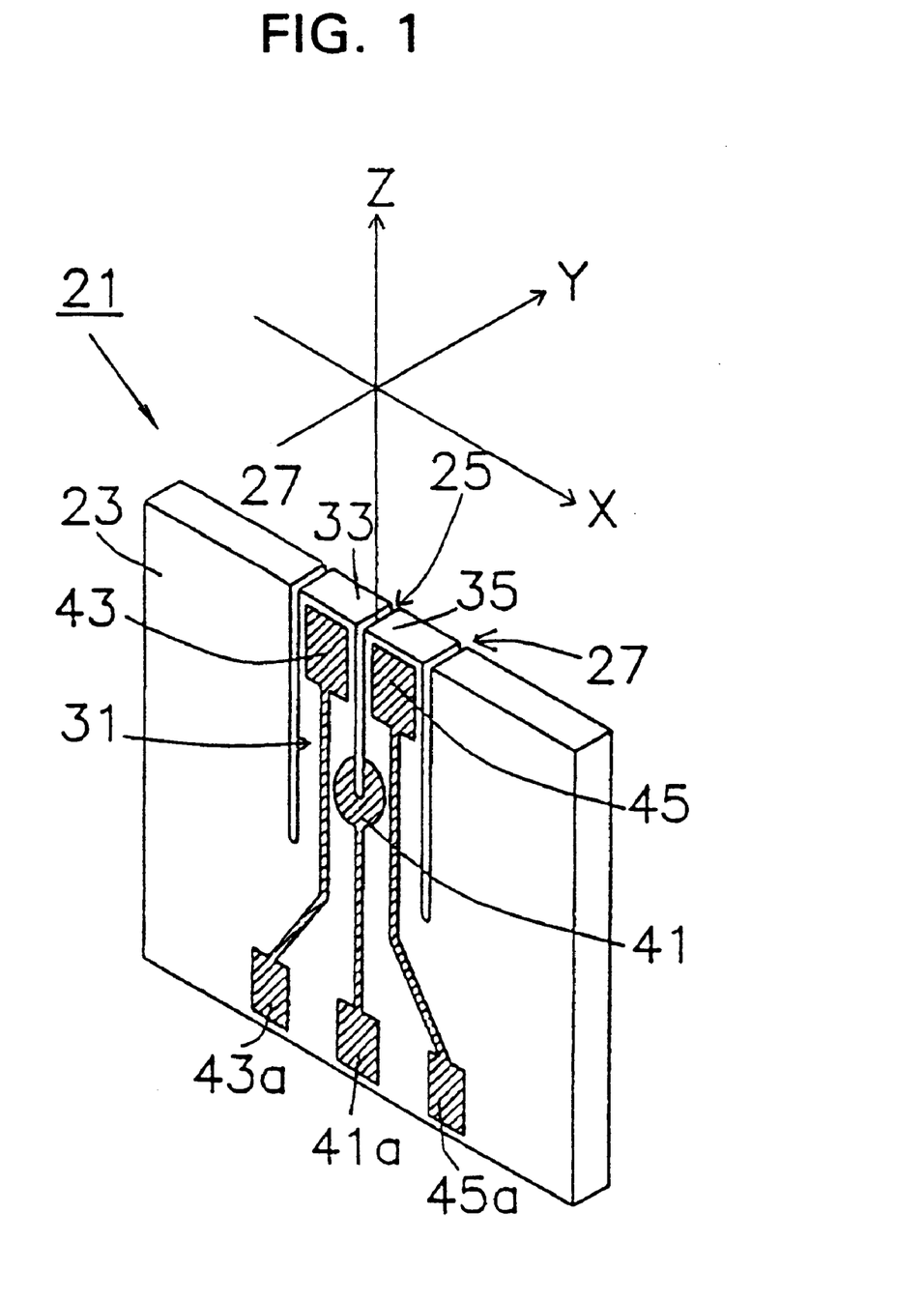
FIG. 1 is a perspective view showing an oscillator of a vibration gyro according to an embodiment of the present invention.
Figure 2A:
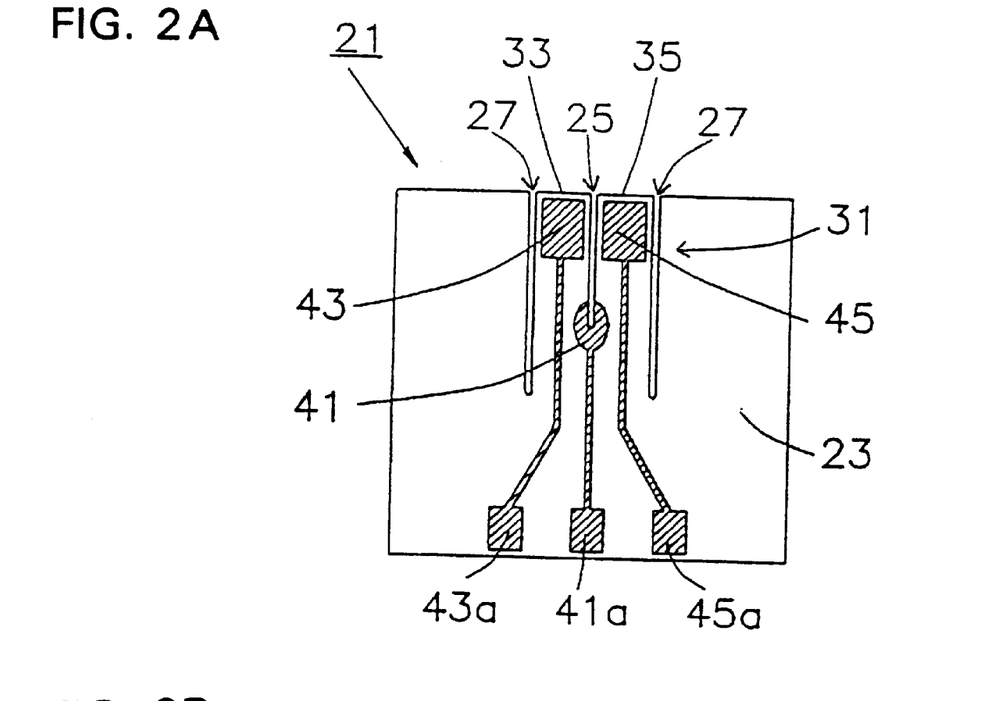
FIGS. 2A and 2B are plan views showing front and rear surfaces of the oscillator shown in FIG. 1.
Figure 2B:
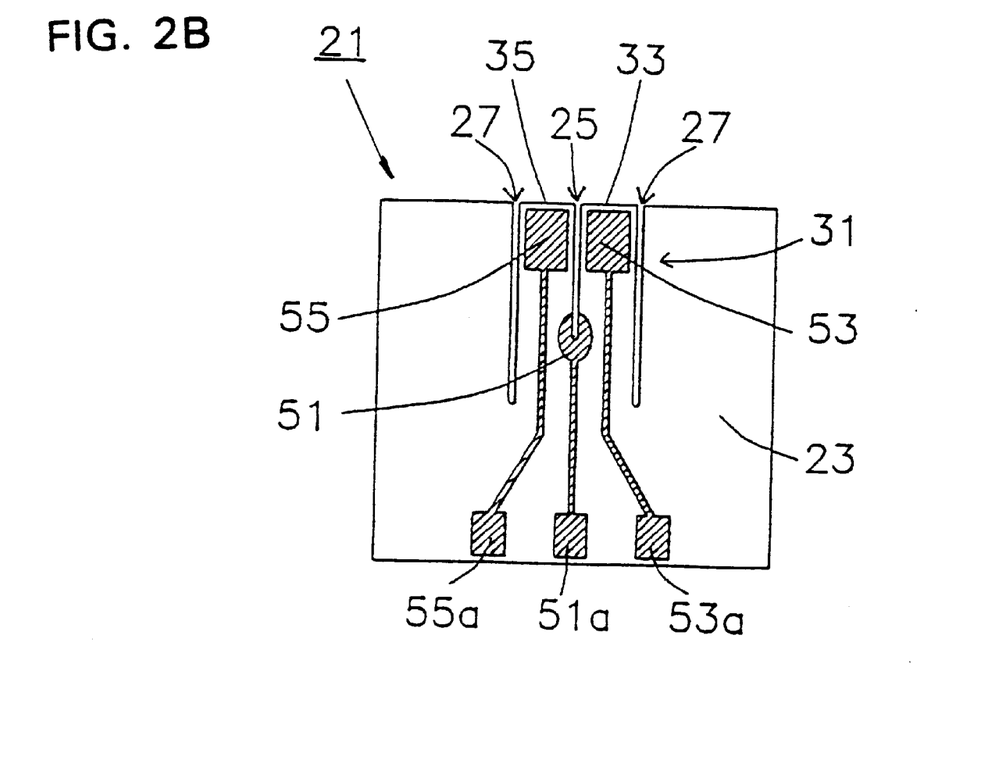

Referring now to the drawings, a description will be made hereinbelow of a vibration gyro according to an embodiment of the present invention. FIG. 1 is a perspective view showing an oscillator of this vibration gyro, FIG. 2A is a plan view showing a front surface side of the oscillator, and FIG. 2B is a plan view showing a rear surface side thereof.

As shown in FIG. 1, an oscillator 21 of the vibration gyro is composed of a square piezoelectric board (base) 23, and a slit 25 for tuning fork formation is made in an edge portion of one side of the piezoelectric board 23 and further slits 27, 27 for tuning fork separation, longer than the slit 25, are provided on both sides of the slit 25 at a given interval so as to form arm portions 33, 35 of a tuning fork section 31.

In this embodiment, a PZT ceramic is used as the piezoelectric board 23 and the slits 25, 27 and 27 are made by the dicing processing using a diamond cutter. In this case, the shapes of the end portions of the slits 25, 27 and 27 are more appropriately made in a U-like configuration than in a rectangular configuration, because, if the configuration of the end portion of the slit were of a rectangular configuration, stresses would concentrate on the corner portions of the end portion of the slit due to the driving of the oscillator 21, the displacement at detection, the shock from external and other sources and hence cracks may occur, while the U-like configuration of the slit end portion can prevent stresses from concentrating on the corner portions of the slit end portion.

Although in this embodiment the PZT is used for the piezoelectric board 23, it is also possible to use other ceramic materials or monocrystal materials such as quartz and LiTaO$_3$. In addition, although dicing is employed as a means to form the slits, it is also appropriate to use mechanical processing using a laser, scientific etching processing based upon photolithography, liquid phase processing using both an etchant for the piezoelectric material and a laser. Further, in the case that the piezoelectric board 23 is made of a ceramic, it is also appropriate that slits are made in a green sheet of a ceramic by press processing and the ceramic then fired.

As shown in FIG. 2A, on a surface of the piezoelectric board 23, a driving electrode 41 having a substantially elliptic configuration is formed in the vicinity of the end portion of the slit 25 whereas detection electrodes 43, 45 each having a rectangular configuration are formed in the arm portions 33, 35 of the tuning fork section 31, respectively. Further, the driving electrode 41 and the detection electrodes 43, 45 are electrically coupled to extending electrodes 41a, 43a, 45a, respectively.

On the other hand, as shown in FIG. 2B, on the rear surface of the piezoelectric board 23, a driving electrode 51 having a generally elliptic configuration is formed in the vicinity of the end portion of the slit 25 whereas detection electrodes 53, 55 each having a generally rectangular configuration are formed in the arm portions 33, 35 of the tuning fork section 31, respectively. Further, the driving electrode 51 and the detection electrodes 53, 55 are electrically coupled to extending electrodes 51a, 53a, 55a, respectively.

In this embodiment, an Ag paste is screen-printed and fired to produce these electrodes and thereafter the piezoelectric board 23 is polarization-processed. Incidentally, the electrodes can also be formed using processes such as sputtering and deposition, and in the case that the piezoelectric board 23 is formed according to a multi-layer method based upon the green sheet of the ceramic, the electrode can also be formed in the interior of the piezoelectric board 23. In addition, although in this embodiment the polarization processing is necessary because PZT is used for the piezoelectric board 23, in the case of using a monocrystal piezoelectric material, the polarization processing becomes unnecessary, and in this case a board may be used which has crystal axis arrangement most suitable for the drive of the oscillator 21 and the detection.

In this oscillator 21, when a drive signal such as a sine wave is applied between the driving electrodes 41 and 51, the spreading vibration is induced from between the driving electrodes 41, 51 of the piezoelectric board 23. This spreading vibration acts as a force for excitation-driving the arm portions 33, 35 of the tuning fork section 31 in the opposite directions, with the result that the tuning fork section 31 starts the tuning fork vibration within a plane (X-Z plane directions in FIG. 1) of the piezoelectric board 23. When in this state a rotational angular velocity is exerted in the longitudinal direction (the Z-axis direction in FIG. 1) of the arm portions 33, 35 of the tuning fork section 31, the Coriolis forces turning in the opposite directions and in directions (the Y-axis direction in FIG. 1) perpendicular to the vibrating direction work on the arm portions 33, 35 of the tuning fork section 31, which brings about displacement. In addition, since charge proportional to this displacement is induced on the detection electrodes 43, 53 and the detection electrodes 45, 55 respectively provided on the arm portions 33, 35 of the tuning fork section 31, the detection electrodes 43, 53 and the detection electrodes 45, 55 offer electric signals having the polarities reverse to each other and proportional to the rotational angular velocity.

Furthermore, this oscillator 21 can be manufactured by taking a simple way in which the slits 25, 27, 27 are made in the piezoelectric board 23, which does not require the complicated processing taken for the oscillator of the prior tuning fork type vibration gyro. In addition, since the driving electrodes 41, 51 and the detection electrodes 43, 45, 53, 55 are provided on the front and rear surfaces of the piezoelectric board 23, the formation of the electrodes becomes easy and the difference made at the processing of the electrodes is reducible. Thus, a vibration gyro according to this embodiment is superior in mass production and can be offered at a low cost.

Figure 3:
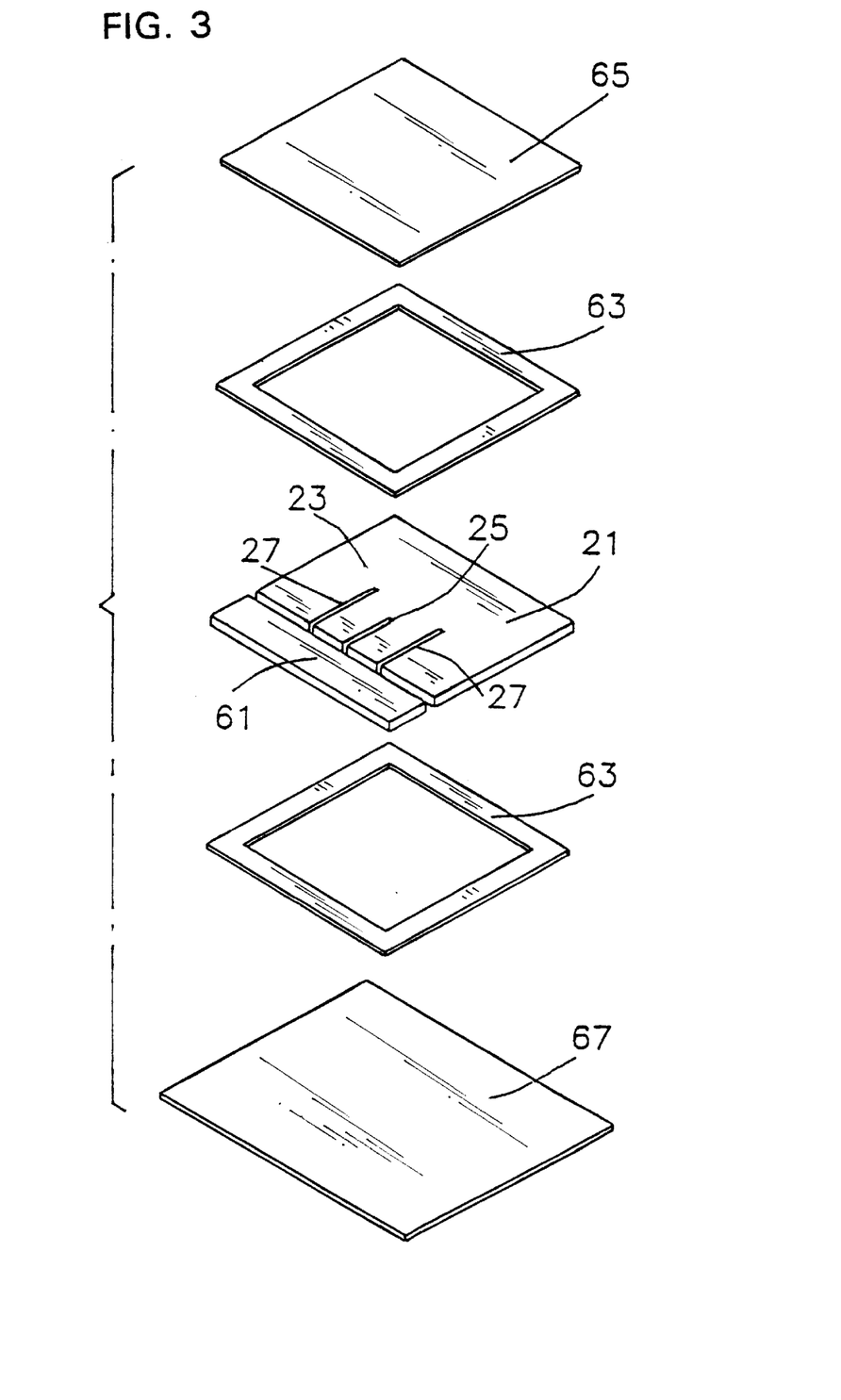
FIG. 3 is an exploded perspective view showing a modification of the FIG. 1 oscillator.
Figure 4:
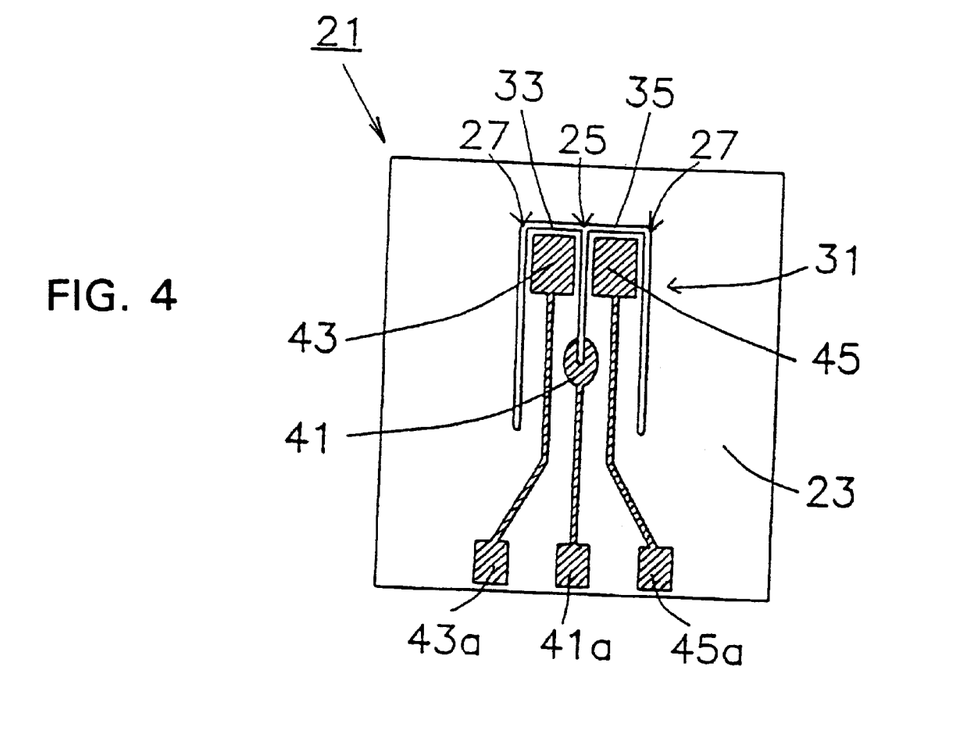
FIG. 4 is a plan view showing another modification of the FIG. 1 oscillator.

Furthermore, FIG. 3 is an exploded perspective view showing a holding and sealing structure of the oscillator 21. In FIG. 3, a dummy board 61 is disposed with respect to the oscillator 21 to be opposed to one edge of the piezoelectric board 23 having the slits 25, 27 and 27. Further, the oscillator 21 and the dummy board 61 are sandwiched between a cover plate 65 and a holding plate 67, which serve as upper and lower covers, and joined thereto in a state that generally frame-like spacers 63, 63 made to conform to the edge portion of both the oscillator 21 and the dummy board 61 are respectively interposed therebetween, and thus hermetically sealed. In this case, the thickness of the spacers 63, 63 is set to be larger than the displacement widths of the arm portions 33, 35 of the tuning fork section 31 at the rotation and set to be smaller than the variation of the oscillator 21 which is brought about when experiencing a shock from the external. Although in this embodiment the junction of these members is made through the use of an epoxy-based adhesive, instead other adhesives, glass frits, wax materials or the like are usable. Further, although in this embodiment the oscillator 21 is held and sealed additionally using the dummy board 61, in cases where the slits are made using the laser processing or the etching processing, as shown in FIG. 4 the tuning fork section 31 can be formed in a central portion of the piezoelectric board 23, so that the dummy board 61 becomes unnecessary.

In the oscillator 21, the spread of vibration induced from the driving electrodes 41, 51 stops in the vicinity of the arm portions 33, 35 of the tuning fork section 31 and the joint portions thereof but not arriving in the vicinity of the edge portion of the oscillator 21. Accordingly, as described above it is possible to adopt a structure in which the edge portion of the oscillator 21 is held between the cover plate 65 and the holding plate 67 in a state where the spacers 63, 63 are respectively interposed therebetween, thereby firmly and stably holding the oscillator 21 without bringing about the leakage of vibration from the oscillator 21. Still further, the cover plate 65 and the holding plate 67 serve as stoppers for the oscillator 21, thereby preventing the damage of the oscillator 21 due to the external shock. Thus, the vibration gyro according to this embodiment is superior in stability and shock resistance.

Figure 5:
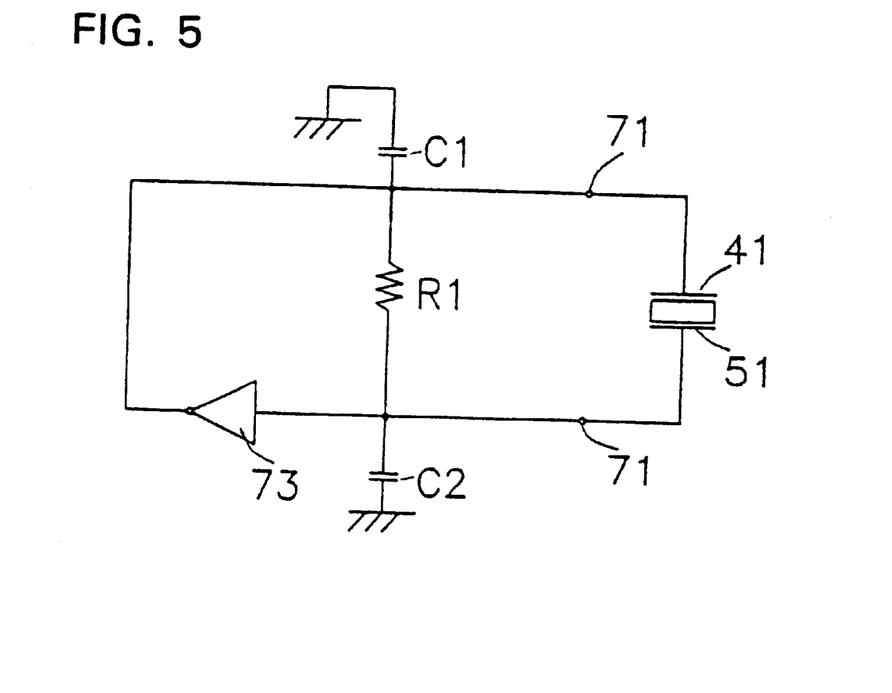
FIG. 5 is a block diagram showing an oscillating circuit serving as vibration gyro driving means in the embodiment of this invention.

FIG. 5 is a block diagram showing an oscillating circuit to be used for a self-excitation driving means in the vibration gyro according to this embodiment. In FIG. 5, numerals 71, 71 represent terminals coupled through the extending electrodes 41a, 51a of the oscillator 21 and the connecting lines formed in the holding plate 67 to the driving electrodes 41, 51, respectively, numeral 73 designates an inverter connected in series to the terminals 71, 71, numeral R1 denotes a resistor connected in parallel to the inverter 73, and numerals C1 and C2 depict capacitors provided between the nodes, between the inverter 73 and the resistor R1, and the ground, respectively.

In the case of the vibration gyro according to this embodiment, since the drive and the detection are mechanically connected to each other, the quality of the driving signal does not create a significant problem. For example, even if in place of the sine wave the driving signal assumes a rectangular wave, a triangular wave or a different wave due to the mixture of these waves, the displacement of the tuning fork section 31 induced by the driving signal substantially results in a sine wave as long as the driving period and the constant phase relationship are maintained. Accordingly, the displacement of the tuning fork section 31 brought about at the rotation and the detection signal have a waveform extremely close to a sine wave.

Figure 6:
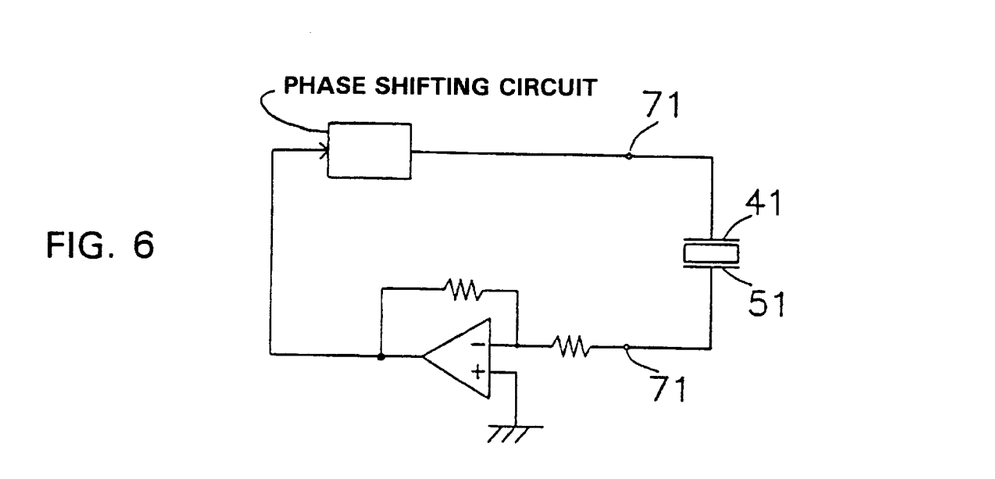
FIG. 6 is a block diagram showing another oscillating circuit for the vibration gyro according to this invention.
Figure 7:
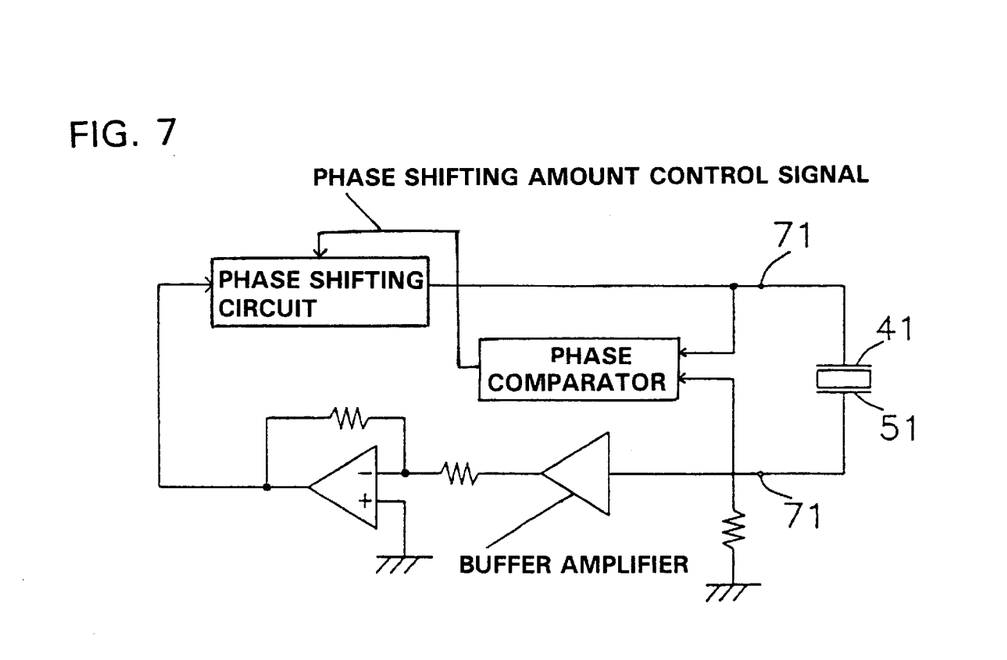
FIG. 7 is a block diagram showing a further different oscillating circuit for the vibration gyro according to the embodiment of this invention.

Although the vibration gyro according to this embodiment employs the oscillating circuit as shown in FIG. 5, it is also possible to adopt an oscillating circuit based upon a combination of an inverting circuit using an operational amplifier and a phase shifting circuit as shown in FIG. 6 or to employ an oscillating circuit using a PLL (phase-locked loop) circuit as shown in FIG. 7. By using the circuit shown in FIG. 6 or 7, the phase shifting amount of the driving signal in the oscillator 21 can be regulated exactly, thus realizing the stabilization of the vibration gyro owing to the stabilization of the oscillation frequency. Besides, it is possible to achieve the stabilization of the drive amplitude by adding an AGC circuit to these oscillating circuits.

Furthermore, although in the vibration gyro according to this embodiment the above-mentioned self-excitation circuit is adopted in order to simplify the construction of the oscillating circuit, it is also possible to adopt a separate excitation circuit which drives the oscillator with an oscillating circuit having a specific frequency. In this instance, the separate excitation circuit takes a crystal oscillating circuit, a PLL oscillating circuit, a CR oscillating circuit, a quadrature oscillating circuit, or the like.

Figure 8:
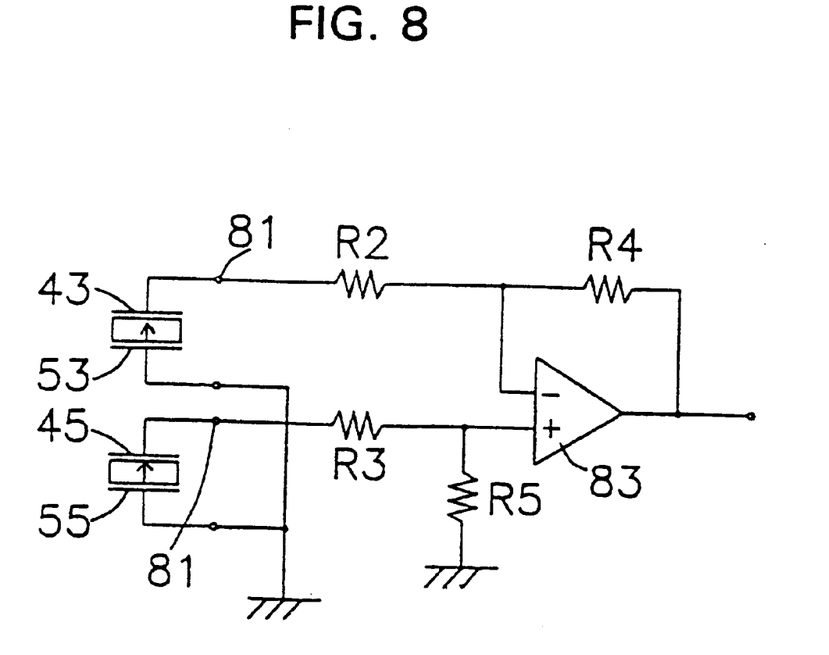
FIG. 8 is a block diagram showing a differential circuit serving as a detection means in the vibration gyro according to the embodiment of this invention.

FIG. 8 is a block diagram showing a differential circuit serving as a detection means in the vibration gyro according to this embodiment. In FIG. 8, numerals 81, 81 represent terminals coupled to the detection electrodes 43, 45 of the oscillator 21, respectively, numeral 83 designates an operational amplifier whose inverting input terminal and non-inverting input terminal are connected to the terminals 81, 81, respectively, numerals R2, R3 denote resistors connected in series between the one terminal 81 and the inverting input terminal of the operational amplifier 83 and between the other terminal 81 and the non-inverting input terminal thereof, respectively, numeral R4 depicts a resistor connected in series between the inverting input terminal and an output terminal of the operational amplifier 83, and numeral R5 signifies a resistor connected between the non-inverting input terminal of the operational amplifier 83 and the ground.

The differential circuit shown in FIG. 8 takes the difference between the electric signals having the polarities reverse to each other and generated in the detection electrodes 43, 45 upon rotation, thereby outputting a detection signal proportional to the rotational angular velocity. Thus, the two advantages of taking the difference between the electric signals from the detection electrodes 43, 45 are that, as compared with the case of not taking the difference therebetween, the in-phase disturbing signals produced in the detection electrodes 43, 45 are removable and the magnitude of the detection signal is doubled. In this case, the disturbing signals produced in the detection electrodes 43, 45 are classified into mechanical signals, thermal signals and electrical signals. The mechanical disturbing signal is a piezoelectric signal caused by the vibration applied from the external to the arm portions 33, 35 of the tuning fork section 31 and is always produced owing to the motion of the movable body on which the vibration gyro is mounted. The thermal disturbing signal is a pyroelectric signal arising due to the temperature variation of the oscillator 21 caused by the heating of the circuit portion within the vibration gyro or the temperature variation outside the vibration gyro. The electrical disturbing signal mainly comes from the leakage of the driving signal applied to the driving electrodes 41, 51 to the detection electrodes 43, 45. Such disturbing signals are all removable by taking the difference between the electric signals from the detection electrodes 43, 45 on the conditions that the mechanical characteristics, electrical-mechanical characteristics and electrical characteristics of the arm portions 33, 35 of the tuning fork section 31 are equal. Accordingly, the detection signal outputted from the differential circuit assumes a sine wave with a frequency depending upon the amplitude proportional to the rotational angular velocity and the driving signal.

Figure 9:
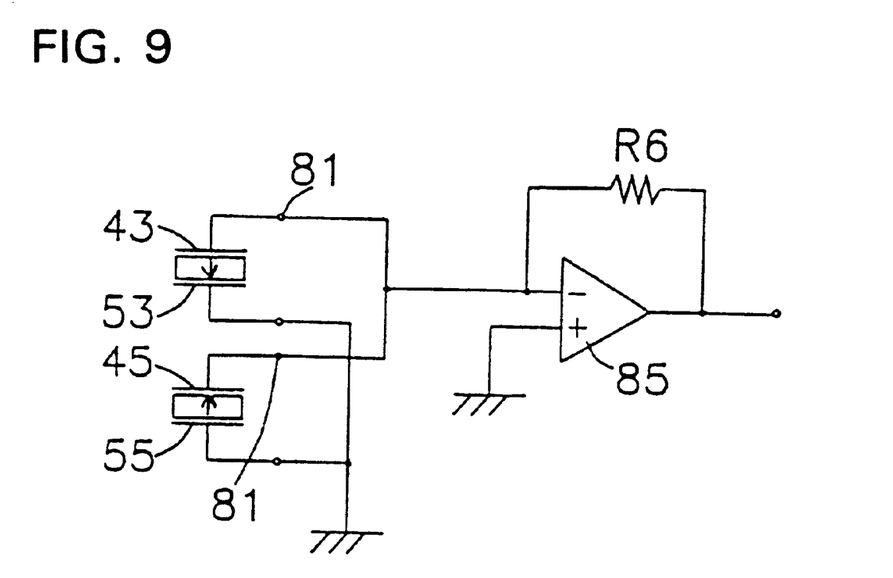
FIG. 9 is a block diagram showing a current-to-voltage converting circuit serving as a detection means in the vibration gyro according to the embodiment of this invention.

Although in the vibration gyro according to this embodiment the differential circuit as shown in FIG. 8 is used as the detection means, for example, it is also appropriate to employ a current-voltage converting circuit as shown in FIG. 9. In the current-voltage converting circuit shown in FIG. 9, the detection electrodes 43, 45 are coupled to each other and the node therebetween is connected to the inverting input terminal of an operational amplifier 85, while the non-inverting input terminal of the operational amplifier 85 is grounded, and a resistor R6 is connected in series between the non-inverting input terminal and the output terminal of the operational amplifier 85. In the case of the FIG. 8 differential circuit, since the current-voltage converting resistor exists, the damping action occurs in the detection electrodes 43, 45 to cause the variation in the responsiveness of the vibration gyro. On the other hand, in the case of FIG. 9 current-voltage converting circuit, without using the current-voltage converting resistor, the current-voltage conversion of the detection signals from the detection electrodes 43, 45 can be made concurrently with taking the difference.

Figure 10:
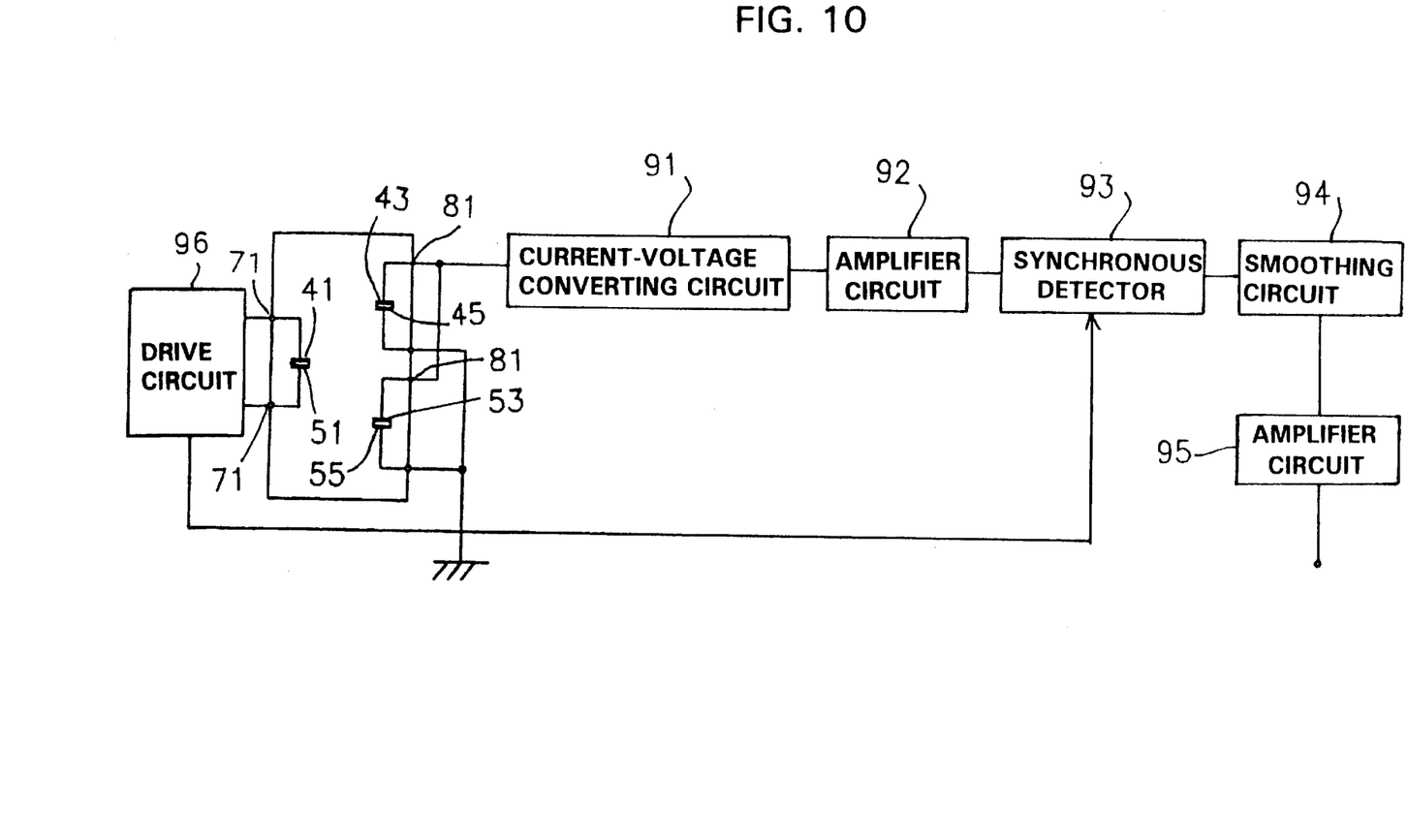
FIG. 10 is a block diagram showing a circuit arrangement of the vibration gyro according to the embodiment of this invention.

Furthermore, the detection signal outputted from the above-mentioned detection means comes out from the vibration gyro as a direct-current signal proportional to the rotational angular velocity through, for example, a circuit with an arrangement as shown in FIG. 10. In FIG. 10, numeral 91 represents a current-voltage converting circuit serving as a detection means, numeral 92 designates an amplifier circuit whose input terminal is connected to an output terminal of the current-voltage converting circuit 91, numeral 93 denotes a synchronous detector circuit whose input terminal is coupled to the output terminal of the amplifier circuit 92, numeral 94 depicts a smoothing circuit whose input terminal is coupled to the output terminal of the synchronous detector circuit 93, numeral 95 signifies an amplifier circuit whose input terminal is connected to the output of the smoothing circuit 94, and numeral 96 stands for an oscillating circuit acting as the drive means, which output terminal is connected to an input terminal of the synchronous detector circuit 93 different from the aforesaid input terminal thereof.

The detection signal outputted from the current-voltage converting circuit 91 is amplified at the amplifier circuit 92 and then inputted to the synchronous detector circuit 93. The synchronous detector circuit 93 rectifies the detection signal from the current-voltage converting circuit 91 at a constant phase synchronized with the driving signal from the oscillating circuit 96. The smoothing circuit 94 smooths a half-wave sine wave being the output of the synchronous detector circuit 93 and converts it into a direct-current signal proportional to the direction and magnitude of the rotational angular velocity. The final-stage amplifier circuit 95 amplifies the dc current obtained from the smoothing circuit 94 at a given magnification to ensure the detection sensitivity required, and further superimposes a dc type bias voltage thereto to output an arbitrary null voltage.

The FIG. 10 circuit shows the basic portion of the vibration gyro circuit, and, when necessary, can further includes an electrical filter such as a low-pass filter, a band-pass filter and a high-pass filter, a standard voltage circuit necessary for operating the vibration gyro with a single power supply, and others.

In addition, referring to the drawings, a description will be made hereinbelow of a vibration gyro according to another embodiment of the present invention. The vibration gyro according to this embodiment differs in only the configuration of the oscillator from the above-described embodiment, and hence the other portions will be omitted for brevity. Further, the parts corresponding or equal to those of the above-described embodiment are marked with the same numerals.

Figure 11:
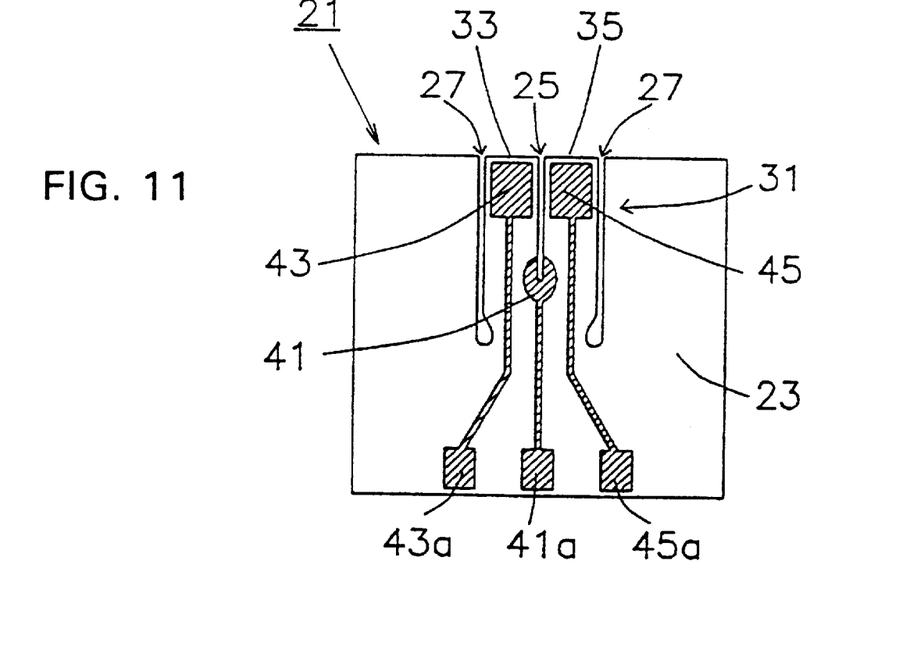
FIG. 11 is a plan view showing an oscillator of a vibration gyro according to another embodiment of the present invention.

As shown in FIG. 11, in the oscillator 21 of the vibration gyro according to this embodiment the widths of the end portions of the slits 27, 27 are made to be larger so that the joint portions of the arm portions 33, 35 of the tuning fork section 31 have smaller widths. If the joint portions of the arm portions 33, 35 of the tuning fork section 31 decrease in width by enlarging the widths of the end portions of the slits 27, 27, the resonance frequency of the tuning fork section 31 in the driving direction rapidly lowers, while the resonance frequency in the detection direction becomes slowly lower. Accordingly, if the resonance frequency of the tuning fork section 31 in the driving direction is made in advance to be higher than the resonance frequency thereof in the detecting direction and the widths of the joint portions of the arm portions 33, 35 are reduced, the resonance frequencies in the driving direction and in the detecting direction are adjustable.

In the case of the tuning fork type vibration gyro, when the resonance frequencies in the driving direction and in the detecting direction are made to coincide with each other, the detection sensitivity comes to a maximum. However, at this time the mechanical quality coefficient Qm of the vibration in the detecting direction also increases to deteriorate the detection responsiveness with respect to the rotational angular velocity. In addition, the phase of the detection signal is used at a resonance point, corresponding to a portion where the rate of change of phase most sharply varies, so that the stability of the detection becomes lacking. Accordingly, in this case, the resonance frequency in the detecting direction is adjusted to be slightly higher than the resonance frequency in the driving direction to avoid the detection side portion where the mechanical response more sharply varies, thereby providing a vibration gyro having a relatively high sensitivity, a high responsiveness and a high stability.

Figure 12:
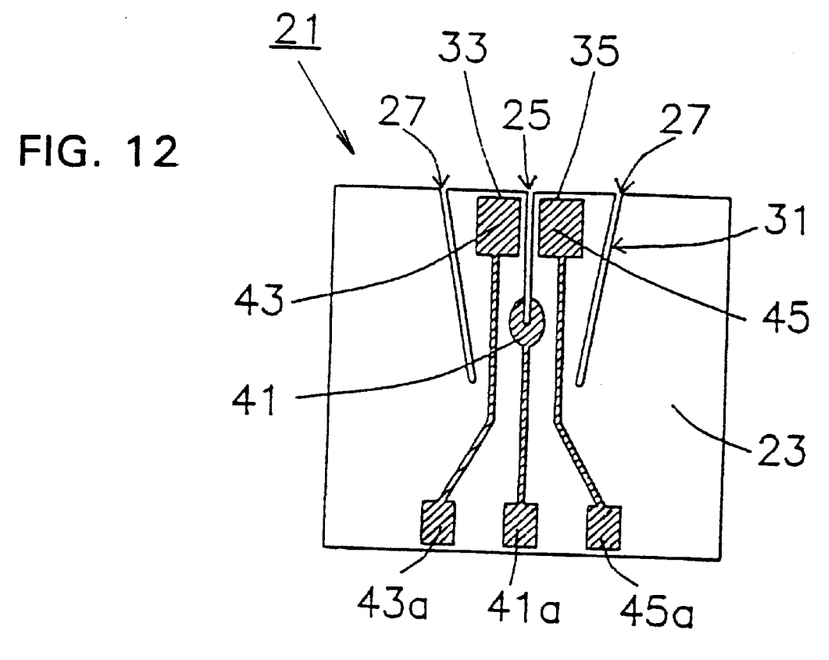
FIG. 12 is a plan view showing a modification of the FIG. 11 oscillator.

Although in this embodiment the widths of the joint portions of the arm portions 33, 35 of the tuning fork section 31 are decreased by enlarging the widths of the vicinity of the end portions of the slits 27, 27, the measures for decreasing the widths of the joint portions of the arm portions 33, 35 of the tuning fork section 31 is not limited to this way, but it is also appropriate that the slits 27, 27 are made obliquely as shown in FIG. 12.

Furthermore, although in the above-described embodiments the driving electrodes 41, 51 are formed in the vicinity of the tip portion of the slit 25 to surround the tip portion of the slit 25, it is also appropriate that, for example, the driving electrodes 41, 51 are symmetrically provided with respect to the slit 25 to step across the slit 25 without surrounding the tip portion of the slit 25. Also in this case, it is possible to accomplish the effects equivalent to those of the above-described embodiments.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An oscillator for a vibration gyro, which comprises:
    a piezoelectric board having first and second opposing flat surfaces defining a tuning fork section comprising a pair of vibratable arm portions;
    a first driving electrode formed on said first flat surface for vibrating said arm portions;
    respective detection electrodes formed on said first flat surface of said arm portions for detecting an angular velocity in a longitudinal direction of said arm portions wherein said tuning fork section is defined by first, second and third slits, said second slit being intermediate, said first and third slits with one arm portion of said arm portions being defined between said first and second slits and with the other arm portion of said pair of arm portions being defined between said second and third slits;
    said first, second and third slits have respective open and closed ends; and
    the width of each of said first and third slits is greater at said closed end thereof than at said open end thereof.

2. An oscillator as defined in claim 1, wherein said first, second and third slits are spaced and generally extend longitudinally and the closed ends of said slits are substantially U-shaped.

3. An oscillator according to claim 2, wherein a second driving electrode is formed on said second flat surface and respective detection electrodes are formed on said second flat surface of said arm portions.

4. An oscillator as defined in claim 1, wherein a second driving electrode is formed on said second flat surface and respective detection electrodes are formed on said second flat surface of said arm portions.

5. An oscillator for a vibration gyro, which comprises:
 a piezoelectric board having first and second opposing flat surfaces defining a tuning fork section comprising a pair of vibratable arm portions;
 a first driving electrode formed on said first flat surface for vibrating said arm portions; and
 respective detection electrodes formed on said first flat surface of said arm portions for detecting an angular velocity in a longitudinal direction of said arm portions wherein said tuning fork section is defined by first, second and third slits, said second slit being intermediate said first and third slits with one arm portion of said arm portions being defined between said first and second slits and with the other arm portion of said pair of arm portions being defined between said second and third slits, and,
 said first, second and third slits have respective open and closed ends, and
 each of said first and third slits is angled toward said second slit such that the spacing between said first and second slits and between said third and second slits is greatest at their respective open ends.

6. An oscillator for a vibration gyro according to claim 5, wherein said board has a longitudinal axis and said first, second and third slits generally extend in a longitudinal direction and said closed ends of said slits are substantially U-shaped.

7. An oscillator according to claim 6, wherein a second driving electrode is formed on said second flat surface and respective detection electrodes are formed on said second flat surface of said arm portions.

8. An oscillator according to claim 5, wherein a second driving electrode is formed on said second flat surface and respective detection electrodes are formed on said second flat surface of said arm portions.

9. A vibration gyro comprising:
 A) an oscillator including a tuning fork section comprising:
  (i) a flat-plate piezoelectric board having first and second tuning fork arm portions on opposite sides of a slit formed in said flat-plate piezoelectric board;
  (ii) a driving electrode formed in the vicinity of an end portion of said slit for making said arm portions of said tuning fork section vibrate; and
  (iii) detection electrodes formed on said arm portions of said tuning fork section, respectively, for generating detection signals representing a rotational angular velocity in a longitudinal direction of said arm portions of said tuning fork section, said detection electrodes being oppositely polarized;
 B) an oscillating circuit for applying a driving signal to said driving electrode; and
 C) a detection circuit for detecting said detection signals.

10. A vibration gyro as defined in claim 9, wherein said oscillator is sandwiched between upper and lower flat-plate covers.

11. A vibration gyro as defined in claim 10, wherein respective spacers having generally frame-shaped configurations to surround said tuning fork section are interposed between said upper and lower covers and said oscillator.

12. A vibration gyro as defined in claim 9, wherein said detection circuit obtains a signal proportional to said rotational angular velocity by taking the difference between said detection signals from said detection electrodes.

13. A vibration gyro as defined in claim 9, wherein a joint portion of each of said arm portions of said tuning fork section is made to have a smaller width than a portion spaced from said joint portion.

14. A vibration gyro as defined in claim 12, wherein a joint portion of each of said arm portions of said tuning fork section is made to have a smaller width than a portion spaced from said joint portion.

15. A vibration gyro which comprises:
 A) an oscillator comprising:
  (i) a piezoelectric board having first and second opposing flat surfaces defining a tuning fork section comprising a pair of vibratable arms;
  (ii) first and second driving electrodes formed on the first and second flat surfaces, respectively, for vibrating said arm portions; and
  (iii) first and second detection electrodes for one of said pair of arm portions formed on said first and second opposed flat surfaces, respectively thereof and third and fourth detection electrodes for the other of said pair of said arm portions for generating detection signals representing a rotational angular velocity in a longitudinal direction of said arm portions of said tuning fork section;
 B) an oscillating circuit for applying a driving signal to said first and second driving electrodes said oscillating circuit being a self-excitation circuit which includes an inverter connected to the first and second drive electrodes; and
 C) a detection circuit for detecting said detection signals.

16. A vibration gyro as defined in claim 15, wherein said oscillating circuit includes an operational amplifier connected between the first and second driving electrodes.

17. A vibration gyro as defined in claim 15, wherein said oscillating circuit includes a phase-locked loop circuit connected between said first and second driving electrodes.

18. A vibration gyro, as defined in claim 15, wherein said detection electrodes on one of said arm portion are oppositely polarized from said electrodes on the other of said pair of arm portions.

19. A vibration gyro as defined in claim 15, wherein said detection circuit comprises a differential circuit.

20. A vibration gyro as defined in claim 15, wherein said detection circuit comprises circuit-voltage converting circuit.

* * * * *